J. MALCOLM.
TRANSMISSION LOCK FOR AUTOMOBILES.
APPLICATION FILED JAN. 16, 1919.
1,351,001.
Patented Aug. 24, 1920.
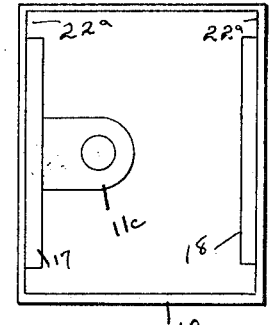
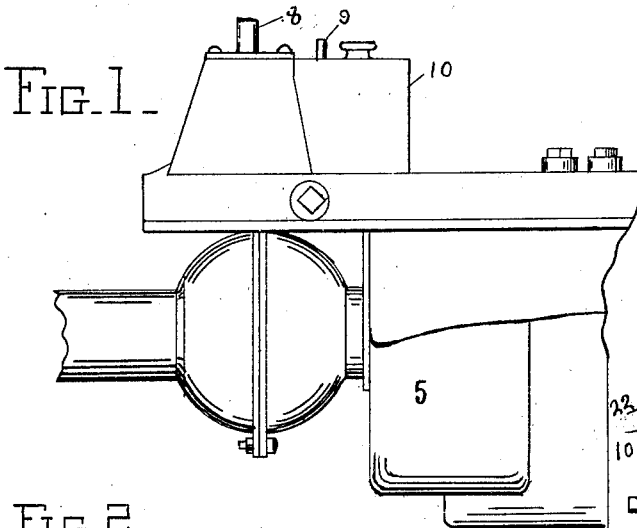
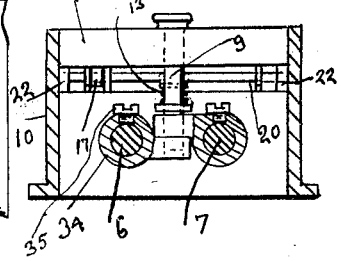
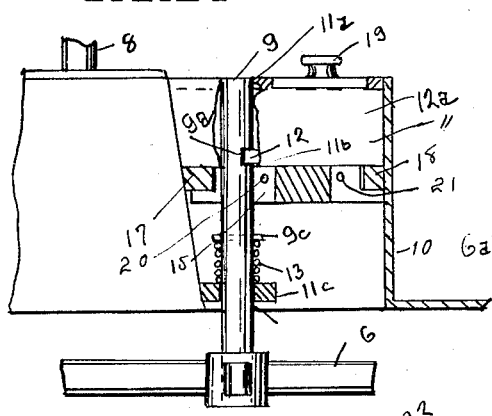
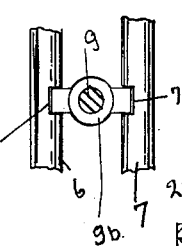
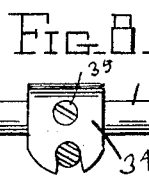
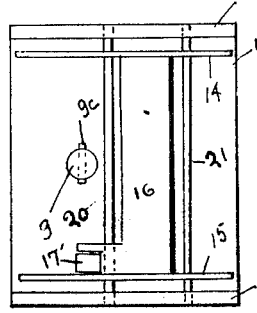
INVENTOR
JAMES MALCOLM
BY Joseph J. O'Brien
ATTORNEY

UNITED STATES PATENT OFFICE.

JAMES MALCOLM, OF HOLYOKE, MASSACHUSETTS.

TRANSMISSION-LOCK FOR AUTOMOBILES.

1,351,001.  Specification of Letters Patent.  Patented Aug. 24, 1920.

Application filed January 16, 1919. Serial No. 271,549.

*To all whom it may concern:*

Be it known that I, JAMES MALCOLM, a citizen of the United States of America, and resident of Holyoke, in the county of Hampden and State of Massachusetts, have invented certain new and useful Improvements in Transmission-Locks for Automobiles, of which the following is a full, clear, and exact description.

This invention relates to improvements in locks for the transmission of automobiles and similar vehicles and consists particularly in means for preventing the operation of the transmission lever, or gear shift lever, and a combination lock for retaining said means in locking position.

One of the objects of the invention is the provision of a locking device consisting of a spring pressed pin, adapted to have locking engagement with the operating rods of a gear transmission, whereby said rods will be held against normal gear shifting action when the pin is in locking position, and a combination lock for retaining the pin in locking position.

Another object of the invention is the provision of a locking device with means for locking the same to the gear shift case of an automobile which cannot be operated from the exterior of the gear case, and means for preventing the operation of the operating rods of the transmission.

With the above and other objects in view the invention relates to certain new and useful combinations, constructions and arrangements of parts, clearly described in the following specification and fully illustrated in the accompanying drawings, in which:—

Figure 1 is a side elevation of a gear case showing the improved locking device thereon, the case of the locking device being formed or cast integral with the head of the gear case.

Fig. 2 is a vertical sectional view through the locking device.

Fig. 3 is a bottom plan view of the lock carrying housing.

Fig. 4 is a detail horizontal sectional view showing the locking pin and the means thereon for locking the gear shifting rods.

Fig. 5 is a top plan view of the lower case of the locking device.

Fig. 6 is a detail vertical sectional view showing the locking pin in locking engagement with the gear shifting rods.

Fig. 7 is a vertical sectional view of a sectional case construction and means for holding the sections assembled.

Fig. 8 is a detail plan view of a two piece collar providing a keeper for the gear shifting rod.

Fig. 9 is a detail vertical sectional view thereof.

Referring to the accompanying drawings illustrating the practical embodiment of my invention 5 designates the case in which the transmission gears, not shown, are arranged. This case contains two parallel rods 6 and 7 which are employed for operating the gear shifting mechanism, whereby any desired gear relation may be obtained by means of the operating lever 8. If the rods 6 and 7 are locked relatively to each other, to prevent relative movement, it will be impossible to shift the gears by the usual movement of the gear shifting lever 8.

In order to lock the rods 6 and 7 to each other to thus prevent shifting of the gears, I form a recess $6^a$ in the rod 6, and a similar recess $7^a$ in the rod 7, and in the two recesses, which are arranged in registered relation, I insert projections $9^e$ of the collar $9^b$ which is secured to the lower end of the locking pin 9. When the lower end of this pin equipped with a cross member $9^b$ which is depressed and the projections $9^e$ forced into the two recesses and the pin held against vertical and horizontal motion, it will be impossible to shift the gears.

The pin 9 projects through the case 10, which is mounted on the gear case 5, and also through the lock case 11, which is mounted within the case 10. The upper end portion of the pin 9 is formed with a recess $9^a$ in its side which is adapted to receive the bit or locking bolt 12 of the locking mechanism $12^a$ arranged within the case 11. The engagement of the locking bolt 12 with the recess $9^a$ of the locking pin is controlled by means of a combination locking mechanism, or other suitable locking mechanism, arranged within the case 11.

When the pin 9 is in locking relation relative to the rods 6 and 7 it will be retained against vertical movement by the locking bolt 12, and against horizontal movement by the case 11, which is provided with holes or openings $11^a$ and $11^b$ through which the pin 9 projects. When the bolt 12 is not in locking engagement with the recess $9^a$ of the pin 9 the upper end of the pin 9 will project above the case 11, by reason of the pressure exerted upon the pin by the coil spring 13, which surrounds the pin and bears at its upper end against the cross pin 9c on the pin 9 and at its lower end on the horizontal wall or partition 11c of the case 10.

The case 11 is locked to the case 10 by means of locking bars 14 and 15, which are connected to each other by the spacing bar 16. The opposite ends of each bar are cut away to slide under the lugs 17 and 18 arranged on the vertical walls of the case 10. The spacing bar 16 and the bar 15 are engaged by the movable element 17' of the locking mechanism within the case 11. When the locking bolt 12 is thrown into unlocking position by means of the combination knob 19, or by a suitable key, the bar 16 and the bars 14 and 15 connected thereto will be shifted on the guide rods 20 and 21, so as to move the ends of the said bars 14 and 15 out of locking engagement with the lugs 17 and 18, whereby the entire locking mechanism and its case may be withdrawn from engagement with the case 10.

The ends of the guide rods 20 and 21 are supported by the pendant ledges 22 of the case 11, and permit of a free sliding action of the bars 14 and 15 and the carrier or spacing bar 16. The ends of the bars 14 and 15 are shifted into locking position relative to the lugs 17 and 18 of the case 10 by means of the spring in the case 11, which actuates the locking element 17'. By turning the knob 19 of the key which operates the locking bolt 12 in the unlocking direction the element 17' will be forced against the bar 15, thus shifting the ends of the bars 14 and 15 into registration with the slots 22 cut through the lugs 17 and 18, and when in this position the case 11 may be withdrawn from the case 10.

In Fig. 7 I show a sectional case construction, wherein the case 26 is locked to the gear case 5a by means of the locking bolts 23, which are shifted into engagement with openings or recesses 24 formed in the vertical walls of the gear case 5a, by means of the sleeve 25, which is formed with internal right and left threads which engage corresponding threads formed on the bolts 23.

The case 26 consists of detachable or separable walls 26', 27, 28 and 29. The opposing walls 26 and 27 are provided with pins 26a and 27a, which are adapted to engage the recesses 28a and 29a formed in the walls 28 and 29. The opposing walls 26 and 27 are connected to each other by means of the coupling sleeve 30, which is threaded on the bosses 31 and 32 and has right and left screw threaded engagement therewith. A bottom member 33 is similarly connected to the walls 26 and 27 and held in locked relation by the coupling sleeve 30, when the device is applied to an old gear case.

In Figs. 8 and 9 as well as in Fig. 6 I show keepers 34 mounted upon the gear shifting rod, each keeper having a bifurcated end to receive the lower end of the locking pin. In Figs. 6 and 8 the keepers 34 are formed in one piece and secured in place by a set screw 35. While in Fig. 9 a keeper comprising a lower section 36 and an upper section 37 are united by a set screw or bolt 38, the lower section having a bifurcated extension and the upper section having a projection 37a to engage a recess in the lower section, whereby the two sections are interlocked when secured around the gear shifting rod.

Having described my invention I claim:—

1. The combination with a transmission gear shift including an operating rod, a vertical locking rod adapted to lock said operating rod against movement, said vertical rod being provided with a notch, a housing inclosing said vertical rod, a case detachably fitted in said housing, a locking mechanism in said case having a lug adapted to enter the notch of the vertical rod, and a bar carried by said case and shiftable by said mechanism to lock said case in said housing when the bolt is in locking engagement with said vertical rod.

2. The combination with a gear shift mechanism including an operating rod or rods, a vertical rod for locking said operating rods or rods a housing for said vertical rod, a spring for lifting said vertical rod in said housing, a case adapted to detachably fit in said housing, said housing being provided with vertical walls having lugs thereon, said lugs being spaced apart to provide notches therebetween, guide rods on said case, locking bars slidable on said guide rods and adapted to enter said notches and have locking engagement with the undersides of said lugs, and a locking mechanism in said case having locking engagement with said vertical rod when it is in a depressed position and means for shifting said bars on said case, whereby said bars will register with said notches.

Signed by me at Springfield, Mass.

JAMES MALCOLM.